(12) United States Patent
Kautzman

(10) Patent No.: US 9,898,854 B1
(45) Date of Patent: Feb. 20, 2018

(54) HYBRID BINDING OF MESHES

(71) Applicant: Pixar, Emeryville, CA (US)

(72) Inventor: Ryan Kautzman, San Francisco, CA (US)

(73) Assignee: Pixar, Emeryville, CA (US)

( * ) Notice: Subject to any disclaimer, the term of this patent is extended or adjusted under 35 U.S.C. 154(b) by 39 days.

(21) Appl. No.: 15/186,318

(22) Filed: Jun. 17, 2016

(51) Int. Cl.
*G06T 15/08* (2011.01)
*G06T 19/20* (2011.01)

(52) U.S. Cl.
CPC .............. *G06T 15/08* (2013.01); *G06T 19/20* (2013.01); *G06T 2219/2008* (2013.01)

(58) Field of Classification Search
None
See application file for complete search history.

(56) References Cited

U.S. PATENT DOCUMENTS

| | | | | |
|---|---|---|---|---|
| 6,476,804 B1* | 11/2002 | Costabel | ................. | G06T 13/20 345/419 |
| 2012/0075340 A1* | 3/2012 | Derose | .................... | G06T 13/40 345/629 |
| 2014/0002463 A1* | 1/2014 | Kautzman | ........... | G06F 17/5018 345/473 |

OTHER PUBLICATIONS

Ju et al. "Mean Value Coordinates for Closed Triangular Meshes", 2005 by the Association for Computing Machinery, Inc.*

* cited by examiner

*Primary Examiner* — Kee M Tung
*Assistant Examiner* — Yanna Wu
(74) *Attorney, Agent, or Firm* — Patterson + Sheridan, LLP

(57) ABSTRACT

The disclosure provides an approach for a hybrid binding of meshes. Multiple meshes having levels of detail appropriate for different regions of a model are topologically connected by binding them together at simulation time. In one embodiment, a simulation application creates both geometric and force bindings between vertices in meshes. The simulation application identifies embedded vertices of a first mesh to be bound to a second mesh as being "best" bound vertices, such as vertices coincident with vertices in the second mesh, and geometrically binds those vertices to appropriate vertices of the second mesh. The simulation application then binds each of the remaining embedded vertices which cannot be geometrically bound to vertices of the second mesh via a force binding, in which a zero-length spring force based technique is used to transfer forces and velocities between the force bound vertex of the first mesh and vertices of the second mesh.

20 Claims, 5 Drawing Sheets

HYBRID BINDING OF MESHES

BACKGROUND

Field

Embodiments presented herein relate to the field of computer animation and, in particular, to animations using a hybrid binding of meshes.

Description of the Related Art

In computer finite element simulation, tetrahedron meshes have been used to discretize the topology of objects being simulated. Each of the finite elements represented by meshes are assigned material properties (e.g., steel, concrete) and simulated. During simulation, stress and strain models are used to determine how each of finite elements behaves when, e.g., forces are applied to them.

The tetrahedron meshes used to represent soft bodies (also referred to as "deformable objects") may require a high level of detail, as soft bodies are able to deform more than rigid bodies having underlying skeletal structures. This can contradict typical finite element simulation quality requirements, such as that the tetrahedra be large and well-formed, with internal dihedral angles between 15 and 135 degrees. In some instances, the requisite level of detail may be much higher for soft bodies. As a result, simulations of such soft bodies may be difficult or fail because they cannot be performed in a tractable amount of time.

SUMMARY

One embodiment provides a computer implemented method for rendering a hybrid binding of meshes. The method generally includes identifying vertices of a first mesh in a model that are embedded in a second mesh in the model. The method further includes creating geometric bindings between one or more of the embedded vertices of the first mesh and one or more vertices of the second mesh, and creating force bindings between the embedded vertices of the first mesh which are not geometrically bound and one or more vertices of the second mesh. Creating the force bindings includes, for each embedded vertex of the first mesh which is not geometrically bound, creating a vertex in the second mesh and linking the created vertex via a spring to the embedded vertex. In addition, the method includes rendering one or more images based on a simulation of the soft body model with the geometric and force bindings.

Other embodiments include a computer-readable medium that includes instructions that enable a processing unit to implement one or more aspects of the disclosed method as well as a system configured to implement one or more aspects of the disclosed method.

BRIEF DESCRIPTION OF THE DRAWINGS

So that the manner in which the above recited aspects are attained and can be understood in detail, a more particular description of aspects of the invention, briefly summarized above, may be had by reference to the appended drawings.

It is to be noted, however, that the appended drawings illustrate only typical aspects of this invention and are therefore not to be considered limiting of its scope, for the invention may admit to other equally effective aspects.

DETAILED DESCRIPTION

Figure 1:
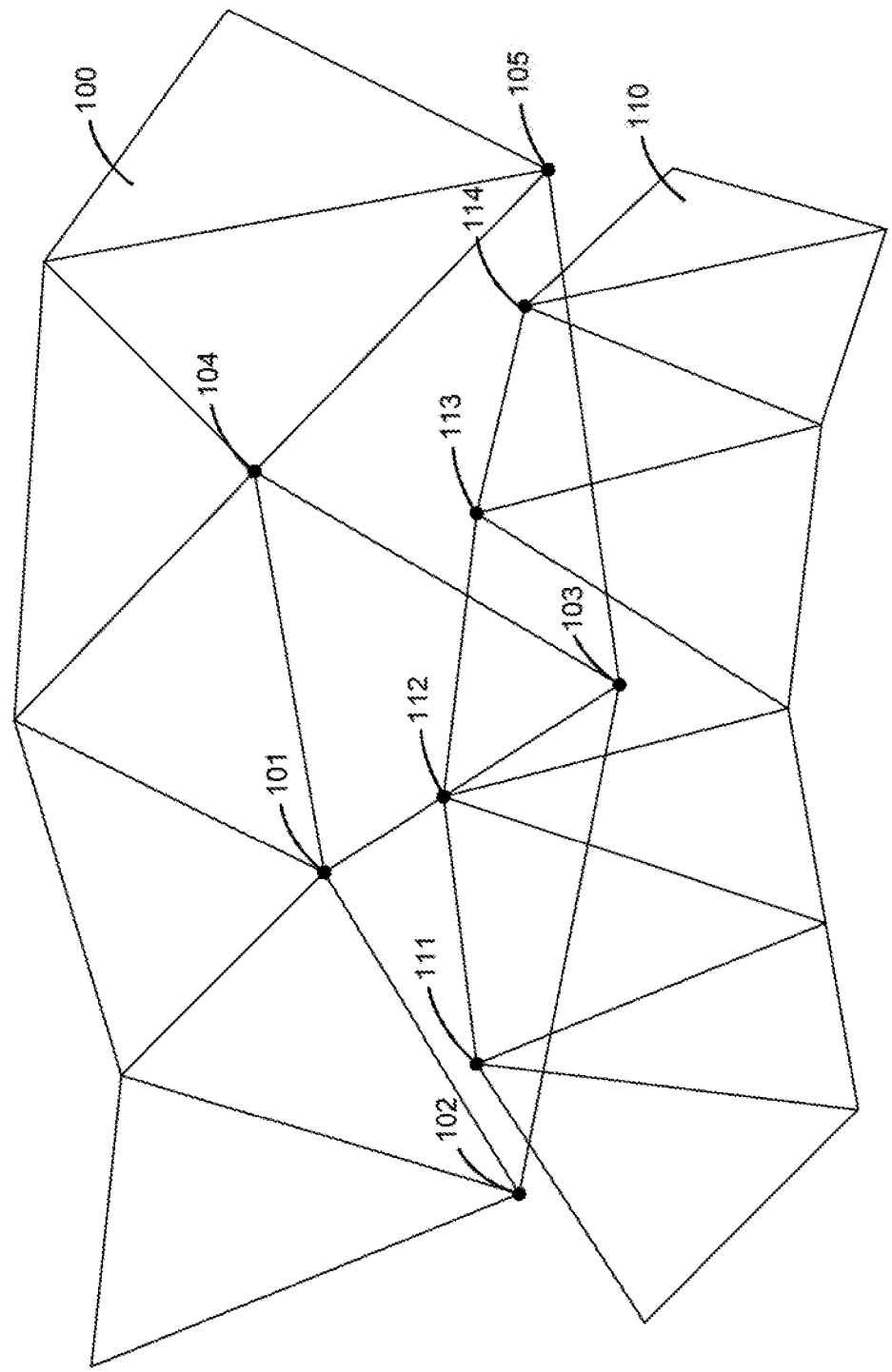
FIG. 1 illustrates an approach for hybrid binding of meshes, according to an embodiment.

Embodiments disclosed herein provide techniques for a hybrid binding of meshes. Rather than using a tetrahedron mesh for an entire soft body model, which may require excessive detail, multiple meshes having levels of detail appropriate for different regions of the model are created and topologically connected by sewing them together at simulation time. Such sewing is also referred to as "binding" the meshes, and, during simulation, pulling on one of the bound meshes results in a pull on the other mesh at the binding points. One approach for binding meshes, referred to herein as "geometric binding," uses barycentric geometric links and distributes a velocity or force on a vertex of one of the bound meshes to the other mesh based on the barycentric coordinates of that vertex with respect to the tetrahedron of the other mesh in which the vertex lands. However, such a geometric binding of meshes may not operate correctly when meshes of different sizes are bound together. For example, a relatively small mesh may have a plurality of vertices embedded to a much larger mesh at the same or substantially the same location, and the plurality of vertices may experiences forces in different directions that cannot all be distributed to the other mesh as constraints.

In one embodiment, a simulation application binds meshes in a hybrid fashion with both geometric and force bindings. The simulation application identifies one or more embedded vertices of a first mesh to be bound to a second mesh as being "best" bound vertices and geometrically binds the best bound vertices to appropriate vertices of the second mesh, i.e., binds them to be processed in the simulation according to a barycentric geometric linking technique. Examples of best bound vertices may include vertices coincident with vertices in the other mesh, vertices landing on an edge or face of the other mesh, and vertices landing inside tetrahedra of the other mesh. After geometrically binding the best bound vertices, the simulation application binds each of the remaining embedded vertices of the first mesh which cannot be geometrically bound to vertices of the second mesh, because vertices of the second mesh needed for the geometric bindings have already been geometrically bound, using a force binding. In such a force binding, a zero-length spring force based technique is used to transfer forces or velocities on the force bound vertex of the first mesh (that cause the force bound vertex to move) to vertices of the second mesh through a shadow vertex that acts as a force conduit.

The following description references aspects of the disclosure. However, it should be understood that the disclosure is not limited to specific described aspects. Instead, any combination of the following features and elements, whether related to different aspects or not, is contemplated to implement and practice the disclosure. Furthermore, although aspects of the disclosure may achieve advantages over other possible solutions and over the prior art, whether or not a particular advantage is achieved by a given aspect is not limiting of the disclosure. Thus, the following aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and flowchart illustrations, and combinations of blocks in the block diagrams and flowchart illustrations can be implemented by special-purpose hardware-based systems that perform the specified functions or acts, or combinations of special purpose hardware and computer instructions.

FIG. 1 illustrates an approach for hybrid binding of meshes, according to an embodiment. As shown, two meshes 100 and 110 are bound, or coupled, together in a model of a soft body object. Although the meshes 100 and 110 are depicted in two dimensions (2D) for simplicity, it should be understood that the meshes 100 and 110 may generally be three-dimensional meshes comprising tetrahedra. In alternative embodiments, other types of meshes, such as voxel meshes, may be used.

In one embodiment, a simulation application identifies vertices 111, 112, 113, and 114 of the mesh 110 that are embedded within the other mesh 100 and creates either geometric or force bindings between the embedded vertices 111, 112, 113, and 114 and vertices of the mesh 100. As used herein, a geometric binding refers to an association of a vertex of one mesh to vertices of another mesh that is processed during simulation via a barycentric geometric linking technique in which velocity impulses or forces that move the vertex of the first mesh are proportionally distributed to vertices of the second mesh based on the barycentric coordinates of the vertex in a tetrahedron of the second mesh, as discussed in greater detail below. In contrast, a force binding refers to a soft binding between vertices in which a shadow vertex coincident with the vertex in the first mesh is created in the second mesh and geometrically bound to vertices of the second mesh, and a zero-length spring is further created linking the shadow vertex in the second mesh and the vertex in the first mesh. The shadow vertex need not change the topology of the second mesh, i.e., the shadow vertex may not be connected by edges to other vertices of the second mesh. During simulation, a force created by the zero-length spring in response to movement of the vertex in one mesh, resulting from a force or a velocity such as that caused by a collision, is distributed to appropriate vertices of the other mesh via the shadow vertex, based on a geometric barycentric coordinates approach. It should be understood that, unlike the constraints created by geometric bindings, bending and stretching are permitted by force bindings, and in some embodiments, the springs used in force bindings may also be weak and breakable. It should further be understood that the terms "spring" and "force" are often used interchangeably, as a spring is a manifestation of an apparatus that imparts a force on its endpoints, and the energy in the system is sometimes referred to as a material entity.

As an example, the simulation application may geometrically bind the vertex 113 to the vertices 103, 104, and 105 of the tetrahedron in which the vertex 113 lies, such that movement of the vertex 113 caused by velocities or forces is distributed to the vertices 103, 104, and 105 based on the barycentric distance of the vertex 113 from each of the vertices 103, 104, and 105. However, in such a case, the vertex 113 cannot also be geometrically bound to the same vertices 103, 104, and 105, as the vertices 113 and 114 may experience forces or velocities in different directions that cannot all be distributed to the vertices 103, 104, and 105 without forcing the vertices 103, 104, and 105 to simultaneously move in different directions. That is, it is an over-constrained system in which there are not enough degrees of freedom in the vertices 103, 104, and 105 to satisfy all potential degrees of freedom in the vertices 113 and 114.

To overcome the shortcomings of the purely geometric binding discussed above, the simulation application in one embodiment may identify one or more embedded vertices of the mesh 110 as being best bound vertices and geometrically bind such best bound vertices to appropriate vertices of the mesh 120. The best bound vertices may generally be determined using any suitable metric, such as proximity to a triangle or tetrahedron's barycenter. In one embodiment, the best bound vertices may include vertices of the mesh 110 that are coincident with vertices in the mesh 100, vertices of the mesh 110 landing on an edge or face of the mesh 100, and vertices of the mesh 110 landing inside tetrahedra of the mesh 100, as discussed in greater detail below. For example, the vertex 112 of the mesh 110 lands on an edge of the mesh 100 and may be considered a best bound vertex. In one embodiment, the simulation application may geometrically bind coincident vertices, vertices of one mesh landing on edges of the other mesh, vertices of one mesh landing on faces of the other mesh, and vertices of the one mesh landing inside tetrahedra of the other mesh, in that order, with certain tie-breaking rules if there are multiple vertices coincident with one vertex of the other mesh, multiple vertices landing on an edge of the other mesh, etc. Further, such geometric bindings may be created only if the vertices of the other mesh required for the geometric bindings have not previously been geometrically bound in the process. Requiring such vertices to not have previously been geometrically bound avoids the overconstrained problem discussed above.

After geometrically binding the best bound vertices, the simulation application further binds each of the remaining embedded vertices of the mesh 110 which cannot be geometrically bound to vertices of the mesh 100, because the vertices of the second mesh needed for the geometric binding have already been geometrically bound, using a force binding in which a zero-length spring force based technique is used to transfer forces and velocities between the force bound vertex of the mesh 110 and vertices of the mesh 100, and vice versa. For example, in the case of the vertices 113 and 114, which cannot both be geometrically bound to the vertices 103, 104, 105 of the mesh 100, the simulation application may geometrically bind only the vertex 113 to the vertices 103, 104, 105. The simulation application may then create a force binding between the vertex 114 and the vertices 103, 104, 105. The vertex 113 may be chosen for the geometric binding based on a tie-breaking rule, such as being closest to a barycenter of the tetrahedron formed by the vertices 103, 104, 105, as discussed in greater detail below.

Figure 2:
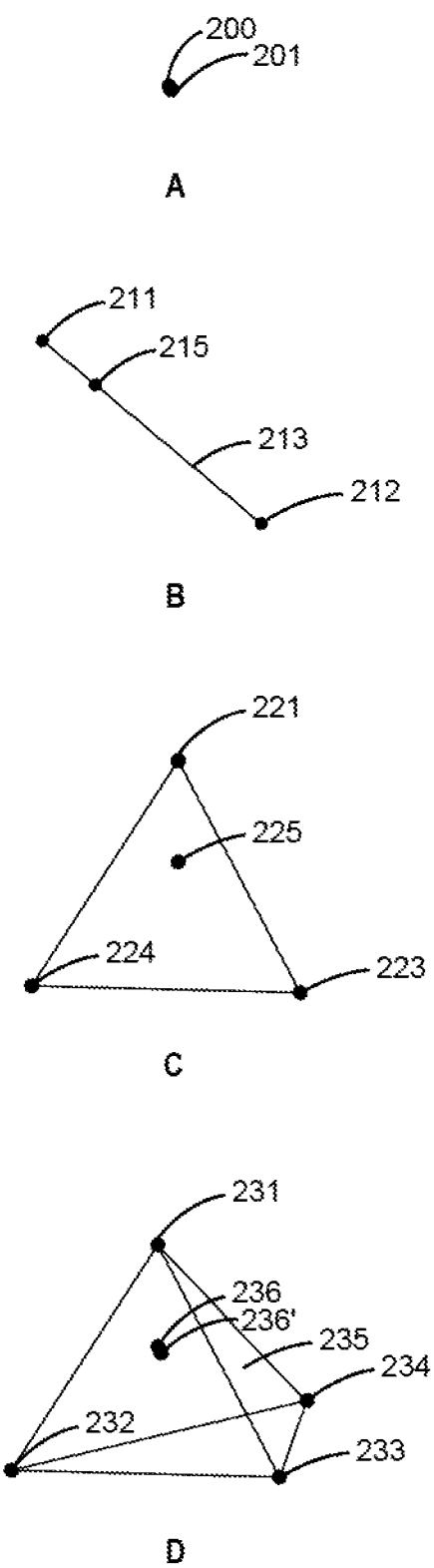
FIG. 2 illustrates examples of best bound vertices, according to an embodiment.

FIG. 2 illustrates examples of best bound vertices, according to an embodiment. As shown in panel A, the simulation application may first identify vertices, such as vertex 200, of the first mesh that are coincident with vertices, such as vertex 201, of the second mesh. The simulation application may then geometrically bind the coincident vertices such that forces and velocities experienced by one vertex (e.g., the vertex 200) are also applied proportionally to the other vertex (e.g., the vertex 201), and vice versa.

After identifying coincident vertices, the simulation application may identify vertices of the first mesh which land on edges of the second mesh. As shown in panel B, a vertex 215 of the first mesh lands on an edge 213 between vertices 211 and 212 of the second mesh. Assuming both of the vertices 211 and 212 are unbound, the simulation application may geometrically bind the vertex 215 of the first mesh to the vertices 211 and 212 of the second mesh. In such a geometric binding, a force or velocity experienced by the vertex 215 may be distributed proportionally to the vertices 211 and 212 based on the distance of the vertex 215 from the vertices 211 and 212, and vice versa. Illustratively, the vertex 215 is closer in distance to the vertex 211 than to the vertex 212. In such a case, more of the force or velocity experienced by the vertex 215 may be distributed to the vertex 211 than to the vertex 212.

After identifying coincident vertices and vertices of the first mesh that land on edges of the second mesh, the simulation application may further identify vertices of the first mesh which land on faces of the second mesh. As shown in panel C, a vertex 225 of the first mesh lands on a face 224 formed by vertices 221, 222, and 223 of the second mesh. Assuming the vertices 221, 222, and 223 of the second mesh are unbound, the simulation application may geometrically bind the vertex 225 of the first mesh to the vertices 221, 222, and 223 of the second mesh. In such a geometric binding, a force or velocity experienced by the vertex 225 may be distributed proportionally to the vertices 221, 222, and 223 based on the barycentric coordinates of the vertex 225, and vice versa. For example, the barycentric coordinates of the vertex 225 may indicate that the vertex 225 is closer to the vertex 221 of the second mesh than to the vertices 222 and 223, in which case more of a force or velocity experienced by the vertex 225 may be distributed to the vertex 221 than to the vertices 222 and 223 based on the distance to those vertices.

After identifying coincident vertices and vertices of the first mesh that land on edges and faces of the second mesh, the simulation application may further identify vertices of the first mesh which land inside tetrahedra of the second mesh. As shown in panel D, a vertex 236 of the first mesh lands inside a tetrahedron 235 formed by vertices 231, 232, 233, and 234 of the second mesh. Assuming the vertices 231, 232, 233, and 234 are unbound, the simulation application may geometrically bind the vertex 236 to the vertices 231, 232, 233, and 234. In such a geometric binding, a force or velocity experienced by the vertex 236 may be distributed proportionally to the vertices 231, 232, 233, and 234 based on the barycentric coordinates of the vertex 236, and vice versa. For example, the barycentric coordinates of the vertex 236 may indicate that the vertex 236 is closer to the vertex 231 of the second mesh than to the vertices 232, 233, and 234, in which case more of a force or velocity experienced by the vertex 236 may be distributed to the vertex 231 than to the vertices 232, 233, and 234 based on the distance to those vertices.

After geometrically binding coincident vertices and vertices of the first mesh that land on edges and faces and inside tetrahedra of the second mesh, the simulation application may create force bindings between the remaining vertices of the first mesh that are embedded in the second mesh but cannot be geometrically bound to vertices of the second mesh because previous geometric bindings exist that would conflict with any further geometric bindings. As discussed, creating such a force binding includes creating a shadow vertex in the second mesh that coincides with the vertex of the first mesh and through which a zero length spring force linking the vertex of the first mesh and the shadow vertex acts to pull the two vertices together whenever they move apart. That is, a force or velocity experienced by the force bound vertex of the first mesh (and causing the force bound vertex to move) produces a zero length spring force that is then distributed proportionally to vertices of the second mesh based on barycentric coordinates. For example, if the vertex 236 shown in panel D were to instead be bound to the second mesh through a force binding, then a shadow vertex 236' may be created at the same position as the vertex 236 in the second mesh. In such a case, a force or velocity experienced by the vertex 236 may move the vertex 236 and create a force in the zero-length spring (not shown because it has zero length) that pulls the vertex 236 and its corresponding shadow vertex together. In turn, the force from the zero-length spring may be distributed to the vertices 231, 232, 233, and 234 of the second mesh geometrically based on the barycentric coordinates of the shadow vertex, similar to the discussion above with respect to the distribution of the force or velocity experienced by the vertex 236 in the geometric binding case.

It should be understood that more than one vertex of the first mesh may be coincident with or land on an edge, face, or inside a tetrahedron of the second mesh. In such cases, tie-breaking rules may be used to create geometric and force bindings. For example, where multiple vertices of the first mesh are coincident with a vertex of the second mesh, the simulation application may, e.g., randomly choose one of the coincident vertices of the first mesh to geometrically bind to the vertex of the second mesh, with the remaining coincident vertices of the first mesh being bound to the second mesh via force bindings. Where multiple vertices of the first mesh land on an edge of the second mesh, the simulation application may choose the vertex of the first mesh that is closest to the center of the edge of the second mesh to geometrically bind to the vertices of the second mesh that form the edge, with the remaining vertices that land on the edge being bound to the second mesh via force bindings. If multiple vertices of the first mesh land on the edge and are the same closest distance from the center of the edge, one of the multiple vertices may be chosen randomly. Similarly, where multiple vertices of the first mesh land on a face or inside a tetrahedron of the second mesh, the simulation application may choose the vertex of the first mesh that is closest to the barycenter of the face or tetrahedron (or randomly choose between vertices that are the same closest distance) to geometrically bind to the vertices of the second mesh that form the face or tetrahedron, respectively, with the remaining vertices of the first mesh that land on the face or inside the tetrahedron being bound to the second mesh via force bindings. Although specific tie-breaking rules are discussed herein, other tie-breaking rules may be used in other embodiments, such as selecting one of the vertices of the first mesh that is closest to a vertex of the second mesh.

Figure 3:
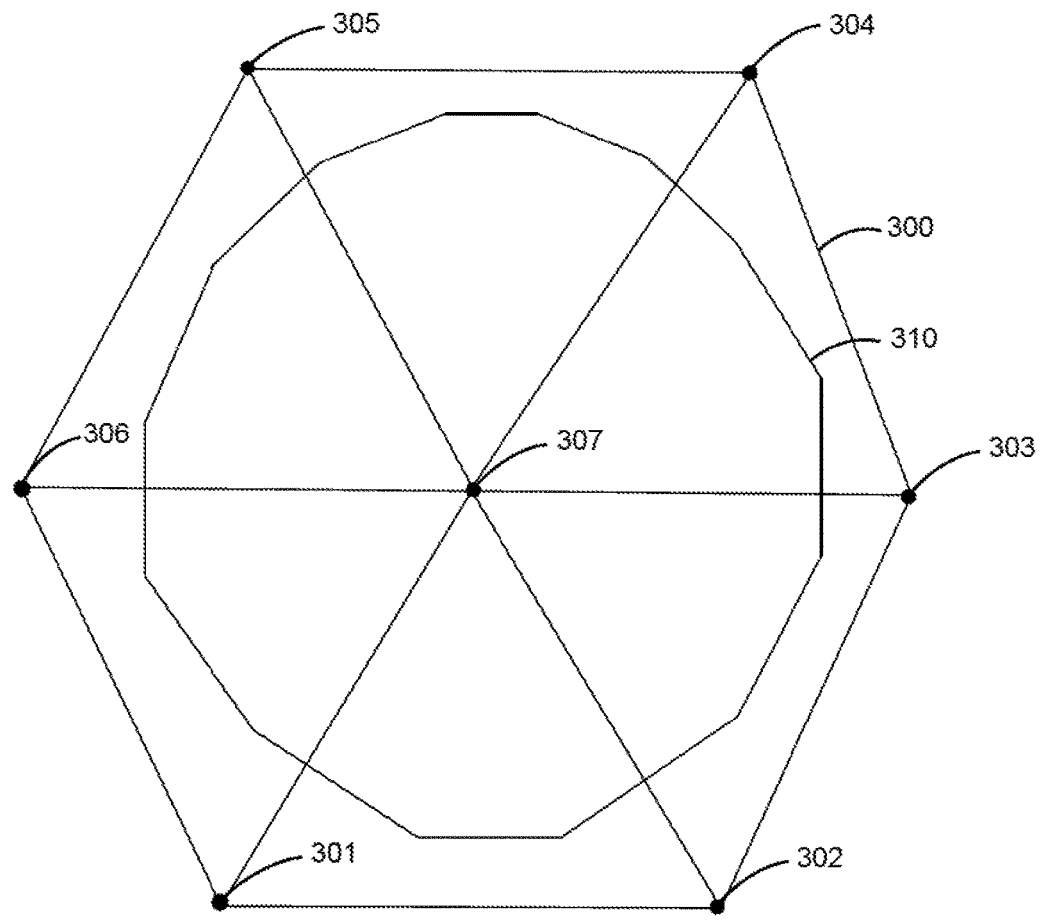
FIG. 3 illustrates an example use case for a hybrid binding of meshes outside of soft body simulation, according to an embodiment.

FIG. 3 illustrates an example use case for a hybrid binding of meshes outside of soft body simulation, according to an embodiment. Although discussed herein primarily with respect to soft body simulations, techniques disclosed herein may also be used to bind meshes in other contexts. For example, in some cases it may be efficient to do finite element simulation on a tetrahedron mesh that is very large and regular, but have a higher resolution collision surface than the exterior of the tetrahedron mesh. This is shown in FIG. 3, where a tetrahedron mesh 300 used for finite element simulation including vertices 301, 302, 303, 304, 305, 306, and 307 that form large, regular triangles in the mesh 300. Such a mesh is blocky, and a more smooth and continuous mesh, shown as the mesh 310, may be used for collisions with objects (e.g., object 320) in the outside world and other interactions. Similar to the discussion above with respect to the finer mesh 110 being bound to the coarser mesh 100 in FIG. 1, it may not be possible to geometrically bind the coarser mesh 300 to the finer mesh 310 without creating overconstrained situations during simulation. To solve this overconstrained problem, the simulation application may instead employ a hybrid binding in which best bound vertices (e.g., vertices coincident with vertices in the other mesh, vertices landing on an edge or face of the other mesh, and vertices landing inside tetrahedra of the other mesh) of the mesh 310 are first geometrically bound, and then the remaining vertices of the mesh 310 embedded in the mesh 300 which cannot be geometrically bound are bounding via force bindings to vertices in the mesh 300.

Figure 4:
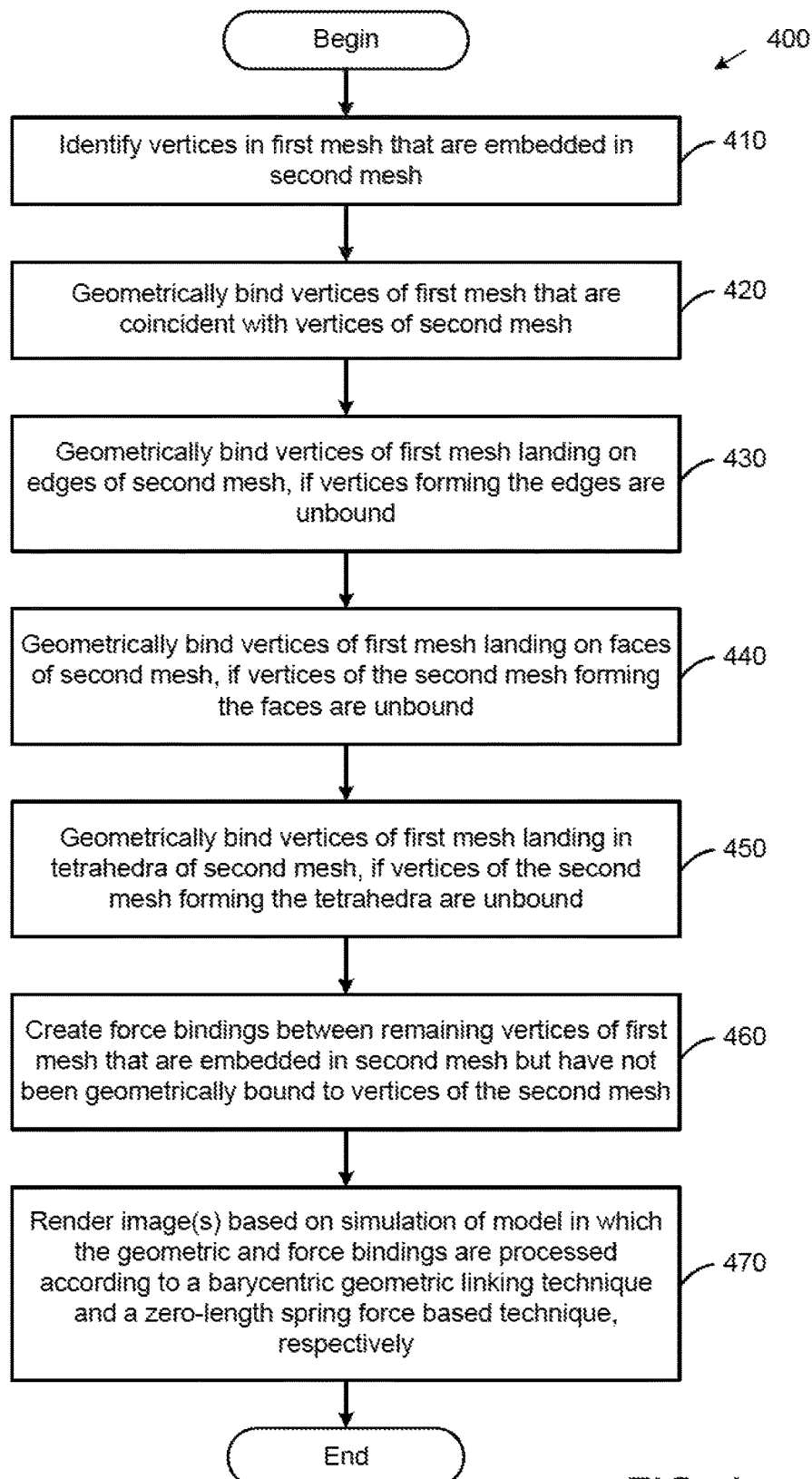
FIG. 4 illustrates a method for rendering a hybrid binding of meshes, according to an embodiment.

FIG. 4 illustrates a method 400 for rendering a hybrid binding of meshes, according to an embodiment. As shown, the method 400 begins at step 410, where the simulation application identifies vertices in a first mesh that are embedded in a second mesh. That is, given the first and second mesh as inputs, the simulation application compares the coordinates of the vertices in the first and second meshes and determines vertices in the first mesh that land in the second mesh, either inside tetrahedra of the second mesh or on edges, faces, or vertices of the second mesh.

At step 420, the simulation application geometrically binds vertices of the first mesh that are coincident with vertices of the second mesh. As discussed, such a geometric binding of coincident vertices results in forces or velocities experienced by the geometrically bound vertices of the first mesh being applied to the coincident vertices of the second mesh, and vice versa, during simulation. If multiple vertices of the first mesh are coincident with a vertex of the second mesh, the simulation application may randomly choose one of the coincident vertices of the first mesh to geometrically bind to the vertex of the second mesh.

At step 430, the simulation application geometrically binds vertices of the first mesh landing on edges of the second mesh, if vertices of the second mesh forming the edges are still unbound. As discussed, such a geometric binding of the vertices to vertices of edges results in forces or velocities experienced by the bound vertices of the first mesh being distributed to the vertices forming the edges based on the distance of the vertices of the first mesh to the vertices forming the edges, and vice versa, during simulation. If multiple vertices of the first mesh land on an edge of the second mesh, the simulation application may choose the vertex of the first mesh that is closest to the center of the edge of the second mesh to geometrically bind to the vertices of the second mesh that form the edge.

At step 440, the simulation application geometrically binds vertices of the first mesh landing on faces of the second mesh, if vertices of the second mesh forming the faces are still unbound. As discussed, such a geometric binding of vertices to the vertices forming the faces results in forces or velocities experienced by the bound vertices of the first mesh being distributed to the vertices of the faces based on barycentric coordinates, and vice versa, during simulation. If multiple vertices of the first mesh land on a face of the second mesh, the simulation application may choose the vertex of the first mesh that is closest to the barycenter of the face to geometrically bind to the vertices of the second mesh that form the face.

At step 450, the simulation application geometrically binds vertices of the first mesh landing in tetrahedra of the second mesh, if vertices of the second mesh forming the tetrahedra are still unbound. As discussed, such a geometric binding of vertices of the first mesh to vertices of tetrahedra results in forces or velocities experienced by the bound vertices being distributed proportionally to the vertices of the tetrahedra based on the barycentric coordinates of the bound vertices, and vice versa. If multiple vertices of the first mesh land inside a tetrahedron of the second mesh, the simulation application may choose the vertex of the first mesh that is closest to the barycenter of the tetrahedron to geometrically bind to the vertices of the second mesh that form the tetrahedron.

At step 460, the simulation application creates force bindings between the remaining vertices of the first mesh that are embedded in the second mesh but have not been geometrically bound to vertices of the second mesh. As discussed, creating a force binding includes creating a shadow vertex in the second mesh that coincides with the vertex of the first mesh and through which a zero length spring force acts to pull the two vertices together whenever they move apart. That is, a force or velocity experienced by the force bound vertex and moving that vertex produces a zero length spring force that is then is distributed proportionally to vertices of the second mesh based on barycentric coordinates, and vice versa.

At step 470, the simulation application renders image(s) based on a simulation of the model in which the geometric bindings and force bindings are processed according to a barycentric geometric linking technique and a zero-length spring force based technique, respectively. The rendered images may be, e.g., frames of a video sequence that may be displayed via a display device. In one embodiment, the simulation may be a finite element simulation with the meshes, in which the barycentric geometric linking and zero-length spring force based techniques are used to couple the meshes together during the simulation. In such a case, the vertices which are geometrically bound at steps 420-440 are then processed according to the barycentric geometric linking technique while the remaining embedded vertices that are bound via force bindings at step 450 are processed according to the zero-length spring force based technique, as discussed above.

Figure 5:
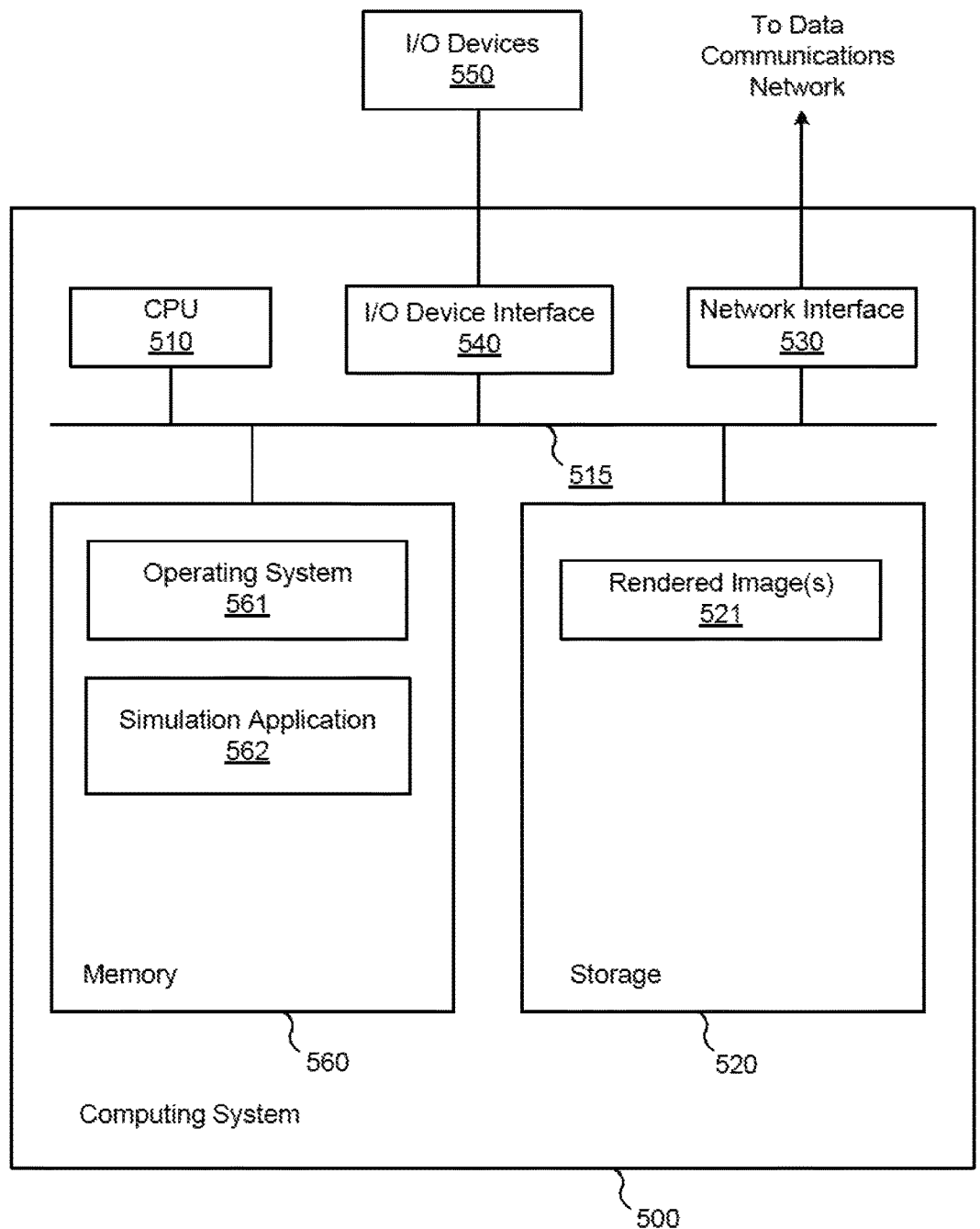
FIG. 5 illustrates a system configured to implement one or more embodiments.

FIG. 5 depicts a block diagram of a system 500 in which an embodiment may be implemented. As shown, the system 500 includes, without limitation, a central processing unit (CPU) 510, a network interface 530, an interconnect 515, a memory 560 and storage 520. The system 500 may also include an I/O device interface 540 connecting I/O devices 550 (e.g., keyboard, display and mouse devices) to the system 500.

The CPU 510 retrieves and executes programming instructions stored in the memory 560. Similarly, the CPU 510 stores and retrieves application data residing in the memory 560. The interconnect 515 facilitates transmission, such as of programming instructions and application data, between the CPU 510, I/O device interface 540, storage 520, network interface 530, and memory 560. CPU 510 is included to be representative of a single CPU, multiple CPUs, a single CPU having multiple processing cores, and the like. And the memory 560 is generally included to be representative of a random access memory. The storage 520 may be a disk drive storage device. Although shown as a single unit, the storage 520 may be a combination of fixed and/or removable storage devices, such as fixed disc drives, flash drives, removable memory cards or optical storage, network attached storage (NAS), or a storage area-network (SAN). Further, system 500 is included to be representative of a physical computing system as well as virtual machine instances hosted on a set of underlying physical computing systems. Further still, although shown as a single computing system, one of ordinary skill in the art will recognized that the components of the system 500 shown in FIG. 5 may be distributed across multiple computing systems connected by a data communications network.

As shown, the memory 560 includes an operating system 561 and a simulation application 562. For example, the operating system may be Microsoft Windows®. The simulation application 562 is configured to simulate objects, such as soft bodied objects, based on a hybrid binding of meshes using both geometric and force bindings, and generate rendered image(s) 521 of the simulated objects for output to a display device. Although shown as an application executed by CPU 510, the simulation application 562 may be implemented differently in other embodiments, e.g., as shaders or in fixed function hardware in a graphics processing unit (GPU), or as a combination of hardware and software. In one embodiment, the simulation application 562 may be configured to identify vertices in a first mesh that are embedded in a second mesh; geometrically bind vertices of the first mesh that are coincident with vertices of the second mesh; geometrically bind vertices of the first mesh landing on edges of the second mesh, if vertices of the second mesh forming the edges are still unbound; geometrically bind vertices of the first mesh landing on faces of the second mesh, if vertices of the second mesh forming the faces are still unbound; geometrically bind vertices of the first mesh landing in tetrahedra of the second mesh, if vertices of the second mesh forming the tetrahedra are still unbound; create force bindings between the remaining vertices of the first mesh that are embedded in the second mesh but have not been geometrically bound to vertices of the second mesh; and render one or more images based on a simulation of the model in which the geometric bindings and force bindings are processed according to a barycentric geometric linking technique and a zero-length spring force based technique, respectively, as discussed above with respect to FIG. 4.

Advantageously, techniques disclosed herein provide a hybrid binding of meshes in which best bound vertices in one mesh are geometrically bound to vertices in another mesh and the remaining vertices are bound via force bindings to vertices in the other mesh. Doing so permits binding of meshes in which a relatively small mesh has a plurality of vertices embedded in a much larger mesh, which as discussed may not be simulated correctly with purely geometric bindings. Such binding of meshes, in turn, permits soft body and other models to be created from multiple different meshes with different levels of detail, as opposed to a single mesh with very high detail, so that a soft body simulation can be performed in a tractable amount of time.

While the foregoing is directed to aspects of the present invention, other and further aspects of the invention may be devised without departing from the basic scope thereof, and the scope thereof is determined by the claims that follow.

What is claimed is:

1. A computer-implemented method for rendering a soft body, comprising:
   identifying vertices of a first mesh in a model of the soft body that are embedded in a second mesh in the model of the soft body;
   creating geometric bindings between one or more of the embedded vertices of the first mesh and associated vertices of the second mesh;
   creating force bindings between the embedded vertices of the first mesh which are not geometrically bound and associated vertices of the second mesh, wherein the creating the force bindings includes, for each embedded vertex of the embedded vertices of the first mesh which has not been geometrically bound, creating a corresponding vertex in the second mesh and linking the created vertex via a respective spring to the embedded vertex; and
   rendering one or more images based on a simulation of the model of the soft body with the geometric and force bindings.

2. The method of claim 1, wherein, during simulation of each of the vertices of the first mesh bound via one of the force bindings:
   a force applied to the force bound vertex of the first mesh causes a spring force to be created by the respective spring associated with the force bound vertex; and
   the spring force is distributed to vertices of the second mesh forming a tetrahedron in which the created vertex linked to the force bound vertex of the first mesh lies based on barycentric coordinates of the created vertex in the tetrahedron.

3. The method of claim 1, wherein the respective spring is a zero-length spring.

4. The method of claim 1, wherein the one or more of the embedded vertices of the first mesh which are geometrically bound to the one or more vertices of the second mesh includes at least one of embedded vertices coincident with vertices of the second mesh, embedded vertices landing on edges or faces of the second mesh, and embedded vertices landing inside tetrahedra of the second mesh.

5. The method of claim 1, wherein the one or more of the embedded vertices of the first mesh which are geometrically bound to the one or more vertices of the second mesh includes embedded vertices coincident with vertices of the second mesh that are geometrically bound to the coincident vertices.

6. The method of claim 5, wherein the one or more of the embedded vertices of the first mesh which are geometrically bound to associated vertices of the second mesh further includes vertices of the first mesh landing on edges of the second mesh and geometrically bound to vertices of the second mesh which form the edges, if the vertices which form the edges have not previously been geometrically bound.

7. The method of claim 6, wherein the one or more of the embedded vertices of the first mesh which are geometrically bound to associated vertices of the second mesh further includes vertices of the first mesh landing on faces of the second mesh and geometrically bound to vertices of the second mesh which form the faces, if the vertices which form the faces have not previously been geometrically bound.

8. The method of claim 7, wherein the one or more of the embedded vertices of the first mesh which are geometrically bound to associated vertices of the second mesh further includes vertices of the first mesh landing inside tetrahedra of the second mesh and geometrically bound to vertices of the second mesh which form the tetrahedra, if the vertices which form the tetrahedra have not previously been geometrically bound.

9. The method of claim 8, wherein:
if multiple embedded vertices of the first mesh are coincident with a vertex of the second mesh, then one of the multiple embedded vertices is randomly selected to be geometrically bound to the vertex of the second mesh;
if multiple embedded vertices of the first mesh land on an edge of the second mesh, then one of the multiple embedded vertices which is closest to a center of the edge is selected to be geometrically bound to vertices of the second mesh forming the edge;
if multiple embedded vertices of the first mesh land on a face of the second mesh, then one of the multiple embedded vertices which is closest to a barycenter of the face is selected to be geometrically bound to vertices of the second mesh forming the face; and
if multiple embedded vertices of the first mesh land inside a tetrahedron of the second mesh, then one of the embedded vertices which is closest to a barycenter of the tetrahedron is selected to be geometrically bound to the vertices of the second mesh forming the tetrahedron.

10. The method of claim 1, wherein the simulation of the model of the soft body is a finite element simulation.

11. A non-transitory computer-readable storage media storing instructions, which when executed by a computer system, perform operations for rendering a soft body, the operations comprising:
identifying vertices of a first mesh in a model of the soft body that are embedded in a second mesh in the model of the soft body;
creating geometric bindings between one or more of the embedded vertices of the first mesh and associated vertices of the second mesh;
creating force bindings between the embedded vertices of the first mesh which are not geometrically bound and associated vertices of the second mesh, wherein the creating the force bindings includes, for each embedded vertex of the embedded vertices of the first mesh which has not been geometrically bound, creating a corresponding vertex in the second mesh and linking the created vertex via a respective spring to the embedded vertex; and
rendering one or more images based on a simulation of the model of the soft body with the geometric and force bindings.

12. The non-transitory computer-readable storage media of claim 11, wherein, during simulation of each of the vertices of the first mesh bound via one of the force bindings:
a force applied to the force bound vertex of the first mesh causes a spring force to be created by the respective spring associated with the force bound vertex; and
the spring force is distributed to vertices of the second mesh forming a tetrahedron in which the created vertex linked to the force bound vertex of the first mesh lies based on barycentric coordinates of the created vertex in the tetrahedron.

13. The non-transitory computer-readable storage media of claim 11, wherein the respective spring is a zero-length spring.

14. The non-transitory computer-readable storage media of claim 11, wherein the one or more of the embedded vertices of the first mesh which are geometrically bound to the one or more vertices of the second mesh includes at least one of embedded vertices coincident with vertices of the second mesh, embedded vertices landing on edges or faces of the second mesh, and embedded vertices landing inside tetrahedra of the second mesh.

15. The non-transitory computer-readable storage media of claim 11, wherein the one or more of the embedded vertices of the first mesh which are geometrically bound to the one or more vertices of the second mesh includes embedded vertices coincident with vertices of the second mesh that are geometrically bound to the coincident vertices.

16. The non-transitory computer-readable storage media of claim 15, wherein the one or more of the embedded vertices of the first mesh which are geometrically bound to associated vertices of the second mesh further includes vertices of the first mesh landing on edges of the second mesh and geometrically bound to vertices of the second mesh which form the edges, if the vertices which form the edges have not previously been geometrically bound.

17. The non-transitory computer-readable storage media of claim 16, wherein the one or more of the embedded vertices of the first mesh which are geometrically bound to associated vertices of the second mesh further includes vertices of the first mesh landing on faces of the second mesh and geometrically bound to vertices of the second mesh which form the faces, if the vertices which form the faces have not previously been geometrically bound.

18. The non-transitory computer-readable storage media of claim 17, wherein the one or more of the embedded vertices of the first mesh which are geometrically bound to associated vertices of the second mesh further includes vertices of the first mesh landing inside tetrahedra of the second mesh and geometrically bound to vertices of the second mesh which form the tetrahedra, if the vertices which form the tetrahedra have not previously been geometrically bound.

19. The non-transitory computer-readable storage media of claim 18, wherein:
   if multiple embedded vertices of the first mesh are coincident with a vertex of the second mesh, then one of the multiple embedded vertices is randomly selected to be geometrically bound to the vertex of the second mesh;
   if multiple embedded vertices of the first mesh land on an edge of the second mesh, then one of the multiple embedded vertices which is closest to a center of the edge is selected to be geometrically bound to vertices of the second mesh forming the edge;
   if multiple embedded vertices of the first mesh land on a face of the second mesh, then one of the multiple embedded vertices which is closest to a barycenter of the face is selected to be geometrically bound to vertices of the second mesh forming the face; and
   if multiple embedded vertices of the first mesh land inside a tetrahedron of the second mesh, then one of the multiple embedded vertices which is closest to a barycenter of the tetrahedron is selected to be geometrically bound to vertices of the second mesh forming the tetrahedron.

20. A system, comprising:
   a processor; and
   a memory, wherein the memory includes an application program configured to perform operations for rendering a soft body, the operations comprising:
      identifying vertices of a first mesh in a model of the soft body that are embedded in a second mesh in the model of the soft body,
      creating geometric bindings between one or more of the embedded vertices of the first mesh and associated vertices of the second mesh,
      creating force bindings between the embedded vertices of the first mesh which are not geometrically bound and associated vertices of the second mesh, wherein the creating the force bindings includes, for each embedded vertex of the embedded vertices of the first mesh which has not been geometrically bound, creating a corresponding vertex in the second mesh and linking the created vertex via a respective spring to the embedded vertex, and
      rendering one or more images based on a simulation of the model of the soft body with the geometric and force bindings.

* * * * *

UNITED STATES PATENT AND TRADEMARK OFFICE
CERTIFICATE OF CORRECTION

PATENT NO. : 9,898,854 B1
APPLICATION NO. : 15/186318
DATED : February 20, 2018
INVENTOR(S) : Ryan Kautzman Page 1 of 1

It is certified that error appears in the above-identified patent and that said Letters Patent is hereby corrected as shown below:

In the Claims

In Column 11, Line 1, in Claim 4, delete "the one or more" and insert -- associated --, therefor.

In Column 11, Line 8, in Claim 5, delete "the one or more" and insert -- associated --, therefor.

In Column 11, Line 54, in Claim 9, after "one of the" insert -- multiple --.

In Column 11, Line 57, in Claim 9, before "vertices" delete "the".

In Column 12, Line 35, in Claim 14, delete "the one or more" and insert -- associated --, therefor.

In Column 12, Line 43, in Claim 15, delete "the one or more" and insert -- associated --, therefor.

Signed and Sealed this
Seventh Day of August, 2018

Andrei Iancu
*Director of the United States Patent and Trademark Office*